3 Sheets—Sheet 1.

A. B. MILLER & R. P. LUDWIG.
Manure-Drills.

No. 198,037. Patented Dec. 11, 1877.

WITNESSES
Ed. I. Nottingham
A. W. Bright

INVENTOR
A. B. Miller
R. P. Ludwig
By Leggett and Leggett, ATTORNEYS

N. PETERS, PHOTO-LITHOGRAPHER, WASHINGTON, D C.

3 Sheets—Sheet 2.

A. B. MILLER & R. P. LUDWIG.
Manure-Drills.

No. 198,037. Patented Dec. 11, 1877

WITNESSES
Ed. I. Nottingham
A. W. Bright

INVENTOR
A. B. Miller.
R. P. Ludwig.
By Leggett & Leggett, ATTORNEYS

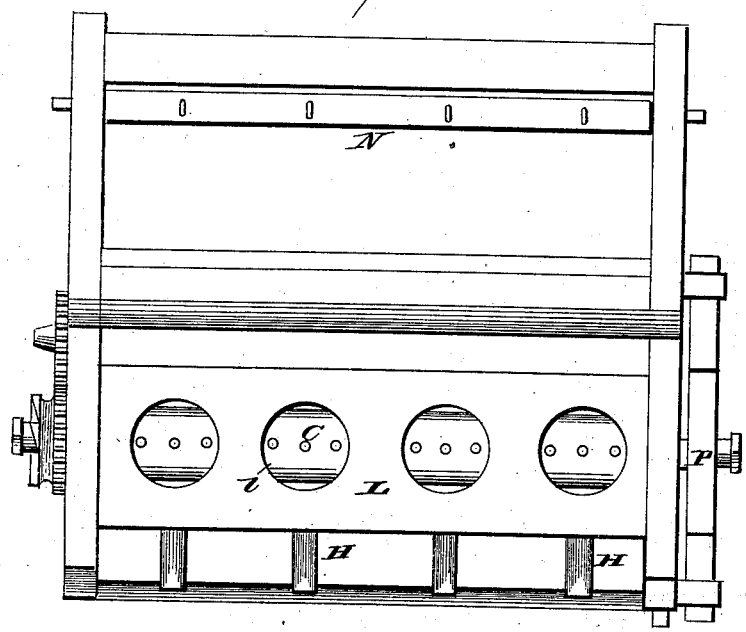
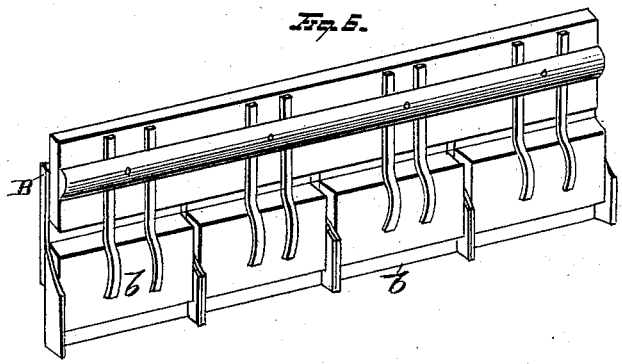

UNITED STATES PATENT OFFICE.

AUGUSTINE B. MILLER AND ROMANUS P. LUDWIG, OF SAUMSVILLE, VA.

IMPROVEMENT IN MANURE-DRILLS.

Specification forming part of Letters Patent No. 198,037, dated December 11, 1877; application filed June 28, 1877.

*To all whom it may concern:*

Be it known that we, AUGUSTINE B. MILLER and ROMANUS P. LUDWIG, of Saumsville, in the county of Shenandoah and State of Virginia, have invented certain new and useful Improvements in Manure-Drills; and we do hereby declare the following to be a full, clear, and exact description of the invention, such as will enable others skilled in the art to which it pertains to make and use it, reference being had to the accompanying drawings, which form part of this specification.

Our invention relates to improvements in manure-drills; and consists in the parts and combination of parts as is hereinafter described and claimed.

Figure 1:
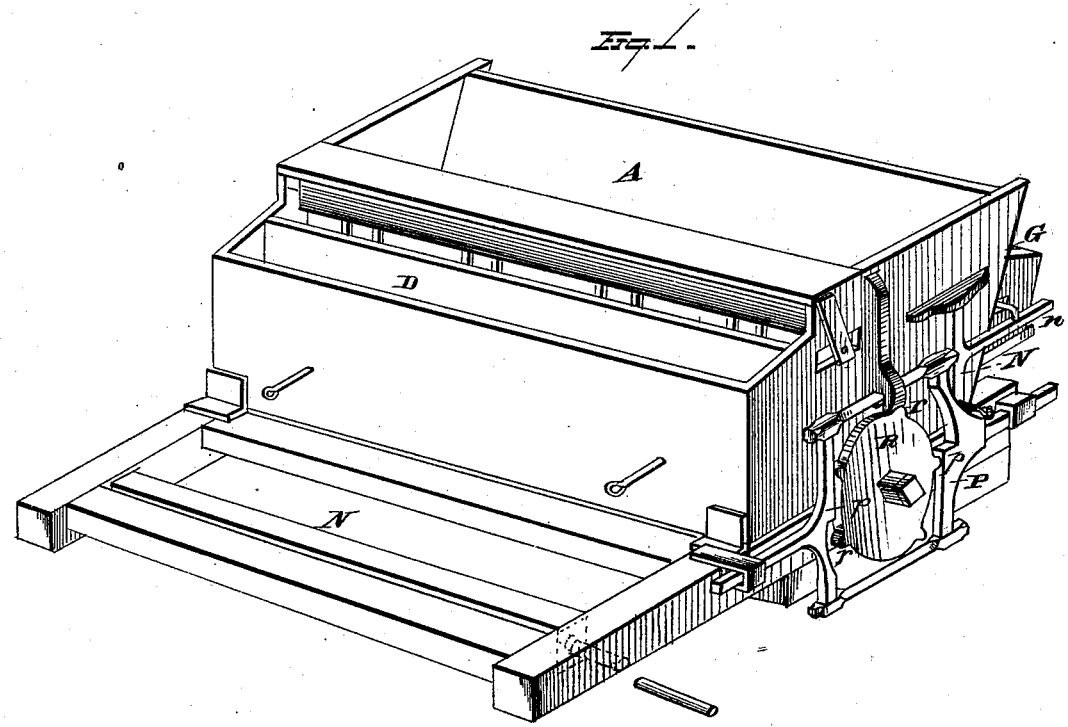
Figure 2:
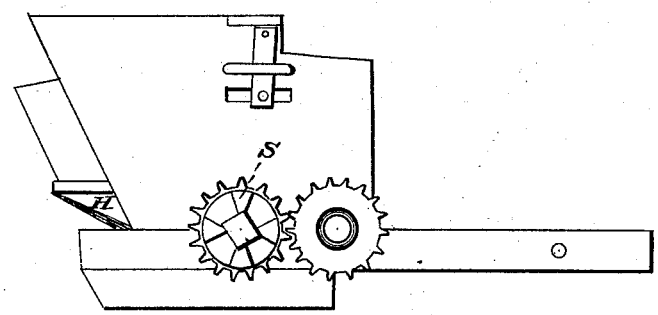
Figure 3:
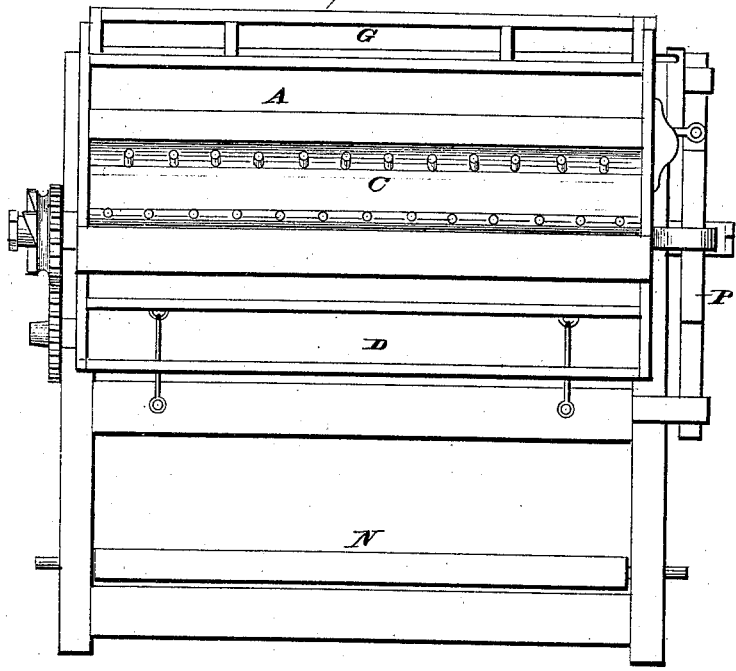
Figure 4:
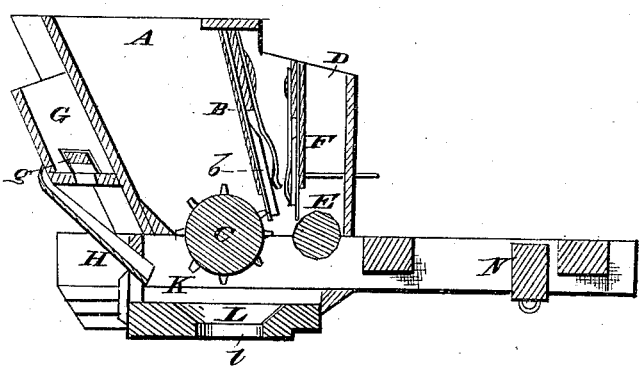

Referring to the drawings, Figure 1 represents in perspective a machine embodying the essential features of our invention. Fig. 2 is an elevation view of that end of the machine not shown in Fig. 1. Fig. 3 is a plan view. Fig. 4 is a vertical cross-sectional view; and Fig. 5 is a reverse plan view. Fig. 6 is a detached view of the spring sectional feed-board of the main fertilizer-chamber.

The main fertilizer-chamber A has the front adjustable feed-board B made with spring-sections $b$, which permit the passage of sticks, stones, and other hard foreign material without injury to the machine, while the picker-roll C is formed upon the axle of the carriage, thus economizing construction of parts.

The front chamber D, for introducing fine fertilizing material into the common receiving-chamber in the base of the machine, is provided with roll E, having projections on its surface, or the latter made polygonal, which grind lime or other fertilizers, and pass them out as triturated matter. This chamber is also provided with a spring-sectioned adjustable feed-board, F, similar to B of the main chamber, and is placed on the rear instead of the front side of its chamber.

The wheat or other grain chamber G, in rear of the main fertilizer-chamber, is made with the seed-slide $g$ controlling the passage of the grain therefrom into the boots H, which latter feed into the common receiving-chamber K in the central lower portion of the machine. A sliding bottom-board, L, of this chamber, with openings $l$ in its body corresponding to the usual delivery-spouts in drill-machines, which latter discharge the seed jointly with the fertilizer into the ground, is shown, for the purpose of convenience in observation, without such delivery-spouts.

The object of making this spout-supporting board detachable is seen in the ready adaptation of the machine to top-dressing purposes, as the removal of the bottom at once renders the machine a fertilizer-sower, leaving the chamber K entirely open.

To further aid in this change of operation, the drag-irons, which, also, are not shown, as unnecessary parts to a full understanding of our invention, are secured to a cross-bar, N, pivoted longitudinally across the extreme front of the machine-frame, and this bar is made in any desired way readily removable from the machine.

By detaching this drag-iron supporting-bar, the machine is stripped of all drilling and dropping mechanism, and made ready to act as a fertilizer-distributer, while, by placing the said bar in the very front of the draft-frame, a direct draft upon the same is obtained. The seed-slide is operated by the short upright rock-shaft N, carrying upper arm $n$, connecting with the slide by link, and controlled under suitable connection by the horizontally-reciprocating frame P, having the two opposite cam-projections $p$ on its inner side. These cams are engaged each, respectively, during one revolution of the wheel R, by the wipers $r$ on the periphery of the wheel, and as the latter works within the frame with its five-point motion, the frame is struck ten times, or reciprocated each way five times.

Clutch-boxes S are attached to the outer axle-extremity on either side of the machine, which, by sliding on a feather and operated by hand-levers, may throw the machine out of operation during transit, when not desired to be worked.

Having fully described our invention, what we claim as new, and desire to secure by Letters Patent, is—

1. In a manure-drill, the combination, with the lower chamber formed centrally below the axle, of the bottom-board and grooves in which the latter slides, the said board being provided with spout-openings, and adapted, as described, whereby it may be readily connected or disconnected with the machine, substantially as described.

2. In a manure-drill, the combination, with the removable bottom-board of the lower chamber, adapted to support suitable discharging-spouts, of the front cross-bar, adapted to engage with suitable drag-attachments, the said cross-bar being made readily detachable from the draft-frame by loose pin-engagement therewith at one of its extremities, substantially as described.

3. In a fertilizer-hopper, the adjustable partition-board made with the independent spring-sections extending in unbroken connection across the entire side of the hopper, substantially as described.

In testimony that we claim the foregoing we have hereunto set our hands and seals this 20th day of June, 1877.

AUGUSTINE B. MILLER. [L. S.]
ROMANUS P. LUDWIG. [L. S.]

Witnesses:
J. W. ELICK,
L. S. WALKER.